Oct. 18, 1966 R. M. CLINEHENS ET AL 3,280,012

METHOD OF MAKING MAGNETIC DEVICE

Original Filed March 27, 1959 2 Sheets-Sheet 1

Inventors
Richard M. Clinehens
Donal A. Meier
By: Louis A. Kline
John J. Matlago
Nathan Cass
Their Attorneys Inventors
Richard M. Clinehens
Donal A. Meier
By: Louis A. Kline
John T. Matlago
Nathan Cass
Their Attorneys.

United States Patent Office 3,280,012

Patented Oct. 18, 1966

3,280,012
METHOD OF MAKING MAGNETIC DEVICE

Richard M. Clinehens, Dayton, Ohio, and Donal A. Meier, Inglewood, Calif., assignors to The National Cash Register Company, Dayton, Ohio, a corporation of Maryland Application Sept. 29, 1961, Ser. No. 143,018, now Patent No. 3,197,749, dated July 27, 1965, which is a continuation of abandoned application Ser. No. 802,494, Mar. 27, 1959. Divided and this application Apr. 29, 1963, Ser. No. 276,542
9 Claims. (Cl. 204—20)

This invention relates to methods for producing thin film bistable magnetic devices having a substantially rectangular hysteresis loop and high speed switching capabilities.

This application is a division of our copending application, Serial No. 143,018, filed September 29, 1961, now Patent No. 3,197,749, which is in turn a continuation of our now abandoned application, Serial No. 802,494, filed March 27, 1959.

The bistability characteristic of certain magnetic materials is well understood; and it is well known that for data-storage or "memory" applications in computers and control devices, the B–H characteristic or loop of the magnetic material must be quite "square." Squareness of the B–H characteristic is defined as the ratio of the magnetic induction at remanence to that under a particular degree of coercive force, and will herein be designated by the term *Br/Bm*. These and other characteristics of magnetic materials are explained in common texts treating the subject of electromagnetism; for example, in the text "Ferromagnetism" by Bozorth.

Briefly, the present invention comprehends a method for making a thin-film magnetic data-storage device of the type which comprises a thin layer of magnetic material deposited on a suitable substrate. Preferably the thin-film layer of magnetic material is cylindrical and is supported upon a stiff slender non-magnetic rod-like support device which is substantially free of torsional strain and which is adapted for easy insertion into and withdrawal from previously formed solenoids which constitute windings for the magnetic device.

Accordingly it is the object of the invention to provide a method for producing an improved high speed thin-film bistable magnetic device adapted for use as a magnetic data-storage element. Other objects and advantages of the invention will hereinafter be made evident in the appended claims and description of a preferred form and mode according to the invention, which description includes the accompanying drawings in which:

Figure 1:
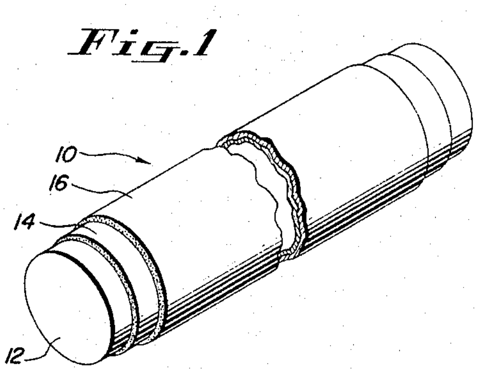
FIG. 1 is a view showing in grossly magnified form, a section of a magnetic device according to the invention, with parts out of proportion to facilitate illustration and explanation.

In FIG. 1 there is depicted somewhat diagrammatically, on a grossly enlarged scale and with relative dimensions exaggerated, a bistable magnetic device according to the invention, a long middle portion of the device having been removed to facilitate illustration. It will be understood that the longitudinal dimension of the device may be from a few times the transverse dimension to many hundreds or thousands of times greater, as will hereinafter be made more fully evident. The magnetic device, indicated generally by the number 10, comprises a stiff non-magnetic electrically non-conductive base structure or element 12 and very thin layers 14 and 16 of electrically conductive material and of magnetic material, respectively. The base structure 12 is preferably a single monofilament of a stiff resilient non-magnetic electrically non-conductive material such as glass or quartz, and serves mainly as a strain-free support for and upon which are applied other elements of the basic magnetic device. The monofilament is of small transverse dimension, the diameter of the exemplary structure 12 hereinafter considered more in detail being about 15 mils (thousandths of an inch). The length of base element 12 is, for practical purposes, at least several times the diameter thereof, but is otherwise not critical and in some possible applications of the completed device would be hundreds of times the diameter. And while it is not necessary that the element 12 be of round cross-section, considerations relative to expense of production of the device and to operating efficiency of the final product, dictate a preference for the round configuration. The reason for stiffness in base structure 12 is to reduce or inhibit likelihood of production of physical strain in the magnetic layer 16 incident to handling of the device 10 subsequent to its manufacture.

Figure 4:
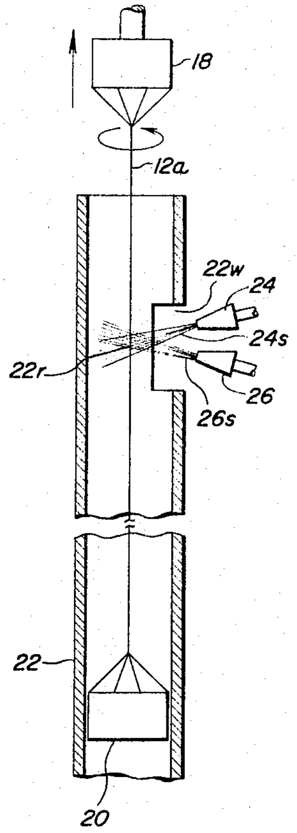
FIG. 4 is a diagrammatic representation of apparatus used to produce a silver coating or substrate upon a rod-like base structure.
Figure 3:
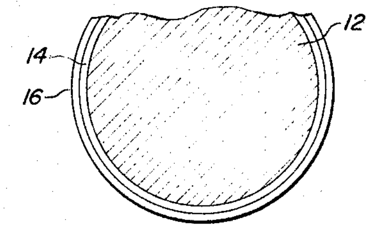
FIG. 3 is a drawing representing an enlarged transverse section of a part of a magnetic device according to the invention, in idealized representation, and with parts out of proportion to facilitate illustration.

There is illustrated in FIG. 4 an apparatus used in producing a silver substrate upon a rod-like base structure 12. The apparatus is in part shown in section and with a portion broken away, to facilitate a clear explanation and illustration of the parts thereof and of their operation. A glass monofilament base structure **12*a* is depicted as extending between two rotary gripping devices 18 and 20 which may be rotatable "pin vises" or the like. The monofilament is thus arranged and disposed for axial rotation and concurrent translation through a suitably positioned tubular guide device 22. Device 22 is provided with an opening or window 22*w* through which are directed jets or sprays 24*s*, 26*s* of suitable silvering solutions supplied through nozzles 24 and 26, respectively. The solutions may be any which will produce a satisfactory and very thin electrically conductive substrate upon the glass monofilament; and may for example be, respectively, Peacock Concentrated Silver Solution and Silver Spray Reducing Solution. The nozzles 24 and 26 may be of known form and are connected by tubing to respective controllable pressurized supplies (not shown) of the two solutions. The two solutions are sprayed across the region 22*r* through which the base structure 12*a* is moved, whereby as the silver solution contacts the rotating structure 12*a*, it is concurrently reduced thereon by the reducer solution, leaving a very thin film or layer of silver on the surface of the glass. As an aid in obtaining a firmly adherent layer of silver, the glass rod may be and preferably is chemically cleaned (as by or with sodium dichromate solution at 130° F. followed by water rinse) and the rod may be and preferably is sensitized by dipping in stannous chloride solution. While the electrically conductive substrate of silver may be accumulated during a single slow pass through the spray region 22**r, a more uniform layer may be produced by drawing the rod through the spray quite rapidly, immediately rinsing in a distilled water spray to remove unreacted silver salts, and repeating the procedure several times (the rod being in the meantime continuously rotated), until a satisfactory depth or thickness of silver has been produced. A silver substrate having an electrical resistance of the order of from 1.5 ohms per inch to 0.4 ohm per inch is satisfactory. However, to reduce electrical losses in the final device, the silver should be as thin as will still provide satisfactory conductivity for plating and a firmly adherent magnetic layer.

The devices 18 and 20 may be moved and rotated by hand or by any suitable apparatus (not shown), it being sufficient for the purposes of the invention that the apparatus be such as to permit a reasonable degree of uniformity in rotation and in translation of the base structure 12a through the spray zone or region 22r. Guide device 22 may be of any desired length, and is preferably such as to confine device 20 to a straight course of movement without appreciable friction.

Figure 5:
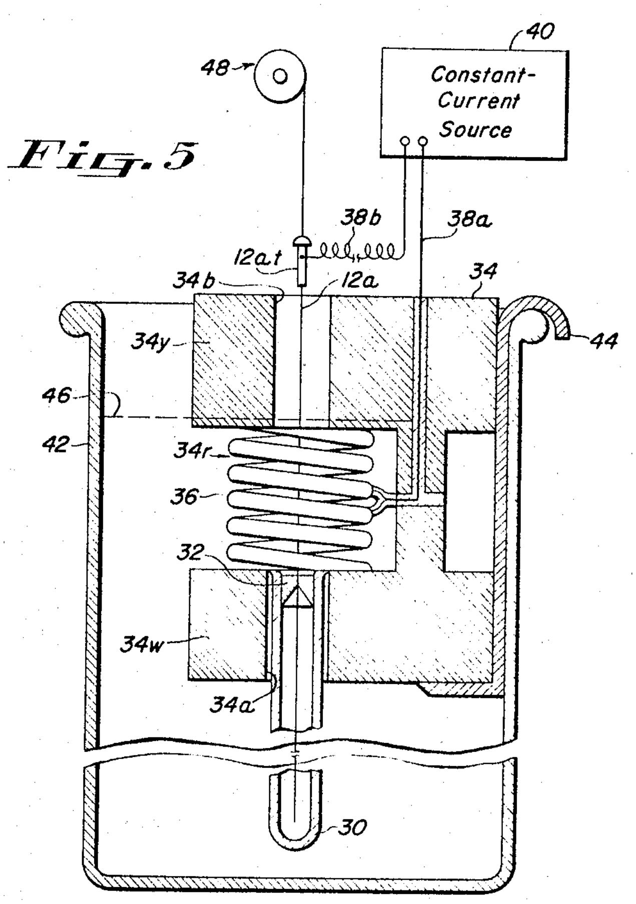
FIG. 5 is a diagrammatic representation of apparatus used to electroplate magnetic material upon a rod-like support device.

Subsequent to the silvering process and preferably immediately thereafter, the silver-coated rod 12a is removed from devices 18 and 20 and an electrical terminal, such as 12at (FIG. 5) is applied onto the upper end portion of the silver substrate. The lower portion of the rod is then lowered into an empty tube 30 which is closed at its lower end. The upper end of the tube is then provided with a seal 32, through which seal the rod extends and is adapted to be drawn. Tube 30 and its cargo of the lower portion of rod 12a are then lowered into the relative positions indicated in FIG. 5, in a support or fixture 34 which is adapted to be disposed in an electroplating bath. The upper wing 34y of fixture 34 is provided with an upper bore 34b through which tube 30 may pass, and the lower wing 34w is provided with a smaller bore 34a through which all except an upper rim portion of the tube passes. Thus tube 30 is supported by the lower wing of the fixture, with rod 12a extending upwardly through the upper bore 34b as shown. Fixture 34 may conveniently be made of a transparent synthetic resin or other type of electrical insulation. Disposed in a recess 34r between the upper and lower wings of the fixture, and substantially coaxial with bores 34a and 34b, is a helical anode electrode 36, to which unidirectional electricity is supplied by way of an insulated electrical conductor 38a which is connected to a constant-current source 40 as indicated in FIG. 5. The other terminal of the source of current is connected to rod terminal 12at by means of a long flexible conductor 38b. Anode electrode 36 may be of nickel wire, and of an open-turn helical form whereby electroplating bath may freely be circulated in and through the region or zone in which electrolytic action occurs. The anode electrode may be held in place in any suitable manner, for example, by utilizing the compression-spring effect of the helical coil when the latter is compressed and then released in the position indicated. Conductor 38a may pass through sealed passages in fixture 34, as indicated.

In use, fixture 34 is disposed within a suitable tank or container 42 which is adapted to contain the electrolyte or electroplating bath, and the fixture may be supported therein in any acceptable way, as by being suspended therein by hook bracket means 44 which is hooked over the rim of container 42 as indicated. An electrolyte 46 is introduced into container 42, to a level no more than slightly above the upper end of anode 36, as indicated.

The electrolyte is a water solution of materials listed in the following table:

| | G./l. |
|---|---|
| Ferrous chloride ($FeCl_2 \cdot 4H_2O$) | 315 |
| Nickel chloride ($NiCl_2 \cdot 6H_2O$) | 10 |
| Calcium chloride ($CaCl_2$) | 180 |
| Water to make solution. | |

Figure 7:
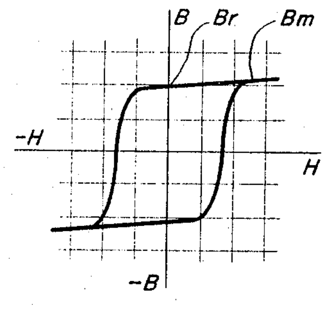

The solution or electrolyte 46 is regulated to a pH of from 0.9 to 1.0, and preferably is maintained at about 75° C. Preferably also the electrolyte is maintained in a state of circulation by gentle stirring. Electric current is supplied and rod 12a is slowly raised by means 48 at such a rate that any particular point thereon is subjected to electroplating action for an appropriate time, relative to the electroplating current density, necessary to produce an iron-nickel magnetic coating or layer having acceptable magnetic characteristics. As an example, with an active electroplating zone one inch long (the distance between wings 34w and 34y) and a current density of about 31 amperes per square foot of exposed surface area of the cathode, traversal of a 15-mil diameter silvered rod at the rate of one inch per 37 seconds produced on the rod a firmly adherent magnetic coating having excellent magnetic characteristics (square B–H loop and optimum coercivity) for magnetic data-storage device uses. The exemplary produced magnetic layer 16 was calculated to be of an apparent average thickness in the range from 2000 A. to 3000 A. (based upon an assumed 100% plating efficiency), and was determined by chemical analysis to be composed essentially of iron and nickel in the ratio of 97 parts iron to 3 parts nickel, by weight. While variations in the time-rate of electroplating may be effected, and variations in electroplating bath used, optimum values of squareness of the B–H loop are secured by following the described procedures and using the cited materials and values. A reproduction of the B–H loop of the magnetic layer, as determined with a longitudinally-extending magnetic field and as displayed upon a cathode-ray oscilloscope, is shown in FIG. 7, wherefrom it may be discerned that the coercivity of the material is about 15 oersteds and the squareness ($Br/Bm$) of the loop is greater than 0.95.

The means for circulating the electrolyte may be thermal, mechanical, or of other suitable known type; and, being per se not of the present invention, is not illustrated in the drawings. The means for rotating and translating device 18 is similarly of any suitable conventional type and hence is not illustrated. The means 48 for traversing rod 12a through the electroplating zone 34r is shown only diagrammatically. It may be a very light weight hoist system of slow-motion character, such as a reel, cord, and capstan driven by clockworks.

Figure 2:
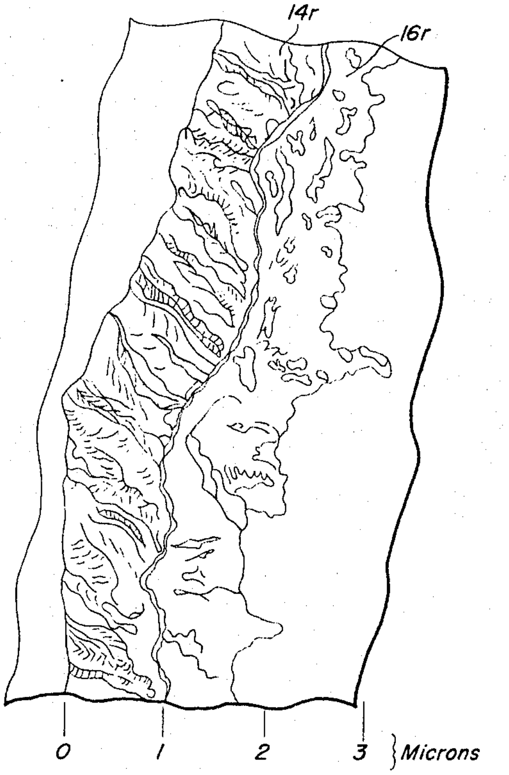
FIG. 2 is a drawing depicting an electron micrograph of a transverse section of a replica-representation of a portion of a magnetic device according to the invention.

The silver substrate 14 upon which the magnetic layer 16 is electrodeposited, and the latter layer itself as well, are of such thinness as to preclude satisfactory physical examination by direct optical observation. Attempts to examine the two layers optically resulted in no provable conclusions as to presence of crystal structure or magnetic orientation. An electron-micrograph of a replica of the end of a very small portion of the silver substrate 14 and the magnetic layer 16 was produced, and a portion thereof is reproduced in FIG. 2 to indicate apparent structural characteristics and apparent thickness dimensions of the layers. The section was taken as nearly to a right-angled cross-section as was practicable. The reproduced portion of the magnified replica indicates, by the scale therebelow, the apparent relative thicknesses of the layers, the silver substrate replica being represented by 14r and the replica of the magnetic material by 16r. The left side of the reproduction of the replica of the silver represents the apparent roughness of the surface of the glass rod. The boundary intermediate 14r and 16r represents tthe apparent nature of the outer surface of the silver substrate, and the right boundary of 16r indicates the apparently irregular thickness and surface configuration of the layer of magnetic material. Other electron-microscope studies of replicas of the surfaces of the silver substrate and of the magnetic layer indicate an apparently amorphous silver structure with a smooth but bumpy surface, and a definitely crystalline magnetic material structure.

Figure 6:
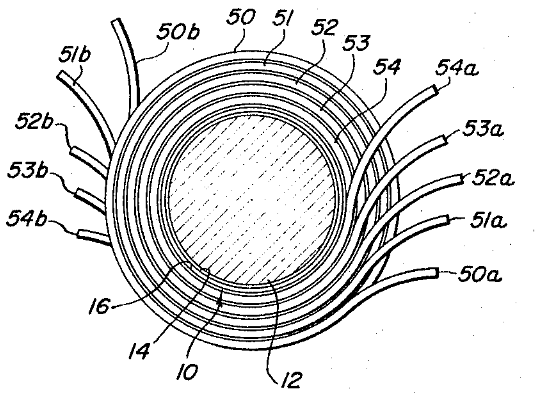
FIG. 6 is an end view of a magnetic device disposed within a set of solenoids; and, FIG. 7 is a B–H loop of a magnetic device according to the invention, as determined with a longitudinally applied magnetic field.

The bistable magnetic device 10 which is produced in accord with the previously explained mode or procedure and with the apparatus and environmental characteristics described, may be of any desired practical length, from a small fraction of an inch to many feet. It may be used in many obvious ways, in conjunction with electrical coils or solenoids which are used, for example, to change the remanent magnetic state, to inhibit such change, and to sense any such change. As a replacement for a series of one or more toroidal cores in magnetic data-storage devices, the device has marked advantages such as are more fully explained in copending applications of Donal A. Meier, Serial No. 728,739, filed April 15, 1958, entitled Magnetic Device, which application was abandoned in favor of Serial No. 795,934, filed February 27, 1959, now Patent No. 3,228,012, and Serial No. 796,892, filed March 3, 1959, entitled Magnetic Data-Storage Device and Matrix, now Patent No. 3,134,965. An indication of the manner in which the device is employed as the magnetic data-storage element of a data-storage unit is furnished by FIG. 6, in which an end-sectional view of a device such as that denoted by 10 in FIG. 1 is shown encircled by appropriate coils or solenoids. In FIG. 6, rod 12 with its layer of electrically conductive metal 14 and adherent layer 16 of magnetic material, is loosely but closely encircled by a set of five concentric solenoids 50, 51, 52, 53, and 54, from which solenoids the device 10 may be readily removed by axial movement. The solenoids, which have respective terminal ends 50*a*–50*b*, 51*a*–51*b*, etc., may be of ten turns each and of insulated wire of about #36 A.W.G. size, although the size of wire and the number of turns may be changed to suit the characteristics and requirements imposed by associated electronic equipment with which the device is to be employed. Solenoid 54 may be a sense coil in which an output potential is induced in response to change of magnetic remanent state of the device (within the solenoids), while the other solenoids may be used as half-current drive windings and inhibit windings, all as more fully indicated in the previously mentioned copending patent applications.

With this disclosure in view it will be evident that modifications of specific features thereof will occur to those skilled in the art, and accordingly it is not desired that the invention be limited to the exemplary details described other than as restricted by the appended claims.

What is claimed is:

1. A process of making a bistable magnetic data-storage device, which process comprises: cleaning a glass monofilament, reducing in situ on the glass monofilament successive thin cylindrical deposits of silver with intervening water rinsing steps, and passing successive portions of the silvered glass monofilament through a restricted electroplating zone and therein electroplating over the silver deposits, a thin layer of a composition of iron and nickel.

2. A process according to claim 1, including the steps of concurrently spraying through a common spray zone a silver solution and a silver reducer solution and contemporaneously therewith rotating the glass monofilament and passing at least portions thereof through the spray zone.

3. A process according to claim 2, including regulating the electroplating current to a value of about 31 amperes per square foot of exposed silver substrate area and limiting the exposure time of the substrate to the electrolyte to about 37 seconds.

4. A process of making a thin film bistable magnetic device exhibiting a substantially rectangular hysteresis characteristic and having a high speed switching capability, said process comprising: electroplating a thin iron-nickel film on a substrate in a water solution comprised of approximately 315 grams/liter of ferrous chloride, 10 grams/liter of nickel chloride, and 180 grams/liter of calcium chloride, the resulting solution being regulated to a pH of from about 0.9 to 1.0.

5. A process of making a thin film bistable magnetic device exhibiting a substantially rectangular hysteresis characteristic and having a high speed switching capability, said process comprising the steps of: providing a relatively stiff substrate, and electroplating a thin iron-nickel film on the substrate in a water solution comprised of approximately 315 grams/liter of ferrous chloride, 10 grams/liter of nickel chloride, and 180 grams/liter of calcium chloride, the resulting solution being regulated to a pH of from about 0.9 to 1.0, the plating current and the time of exposure of the substrate being chosen so as to produce on the substrate a thin film bistable magnetic layer comprised essentially of approximately 97 parts iron and 3 parts nickel, by weight.

6. A process of making a thin film bistable magnetic device exhibiting a substantially rectangular hysteresis characteristic and having a high speed switching capability, said process comprising the steps of: providing a long length of a stiff rod-like substrate having a conductive surface, and electroplating the substrate in a nickel chloride-iron chloride aqueous solution chosen so as to electroplate a thin magnetic film on said substrate composed of approximately 97 parts iron and 3 parts nickel, by weight.

7. A process of making a thin film bistable magnetic device exhibiting a substantially rectangular hysteresis characteristic and having a high speed switching capability, said process comprising the steps of: providing a long length of a stiff rod-like substrate having a conductive surface, and electroplating the substrate in a nickel chloride-iron chloride aqueous solution chosen so as to electroplate a thin magnetic film on said substrate having a thickness of approximately 2,000 to 3,000 angstroms and composed of approximately 97 parts iron and 3 parts nickel, by weight.

8. A process of making a thin film bistable magnetic device exhibiting a substantially rectangular hysteresis characteristic and having a high speed switching capability, said process comprising the steps of: providing a long length of a stiff rod-like substrate having a conductive surface, and electroplating the wire in a nickel chloride-iron chloride aqueous solution by connecting the substrate as the cathode of the system and passing the substrate through a spiral anode electrode, said solution being comprised of approximately 315 grams/liter of ferrous chloride, 10 grams/liter of nickel-chloride, and 180 grams/liter of calcium-chloride and being regulated to a pH of from about 0.9 to 1.0, the plating current and the time of exposure of each portion of the wire in the plating solution being chosen so as to electroplate a thin magnetic film on the substrate composed of approximately 97 parts iron and 3 parts nickel, by weight.

9. A process of making a thin film bistable magnetic device exhibiting a substantially rectangular hysteresis characteristic and having a high speed switching capability, said process comprising the steps of: providing a glass monofilament, reducing in situ on the glass monofilament successive thin cylindrical deposits of silver with intervening water rinsing steps by successively passing the glass monofilament while being rotated through a spray zone into which is sprayed a silver solution and a silver reducer solution, and then electroplating the silvered glass so formed in a nickel chloride-iron chloride aqueous solution comprised of approximately 315 grams/liter of ferrous chloride, 10 grams/liter of nickel-chloride, and 180 grams/liter of nickel chloride regulated to a pH of from about 0.9 to 1.0, the plating current and the time of exposure of the substrate being chosen so as to electroplate on the substrate a thin film bistable magnetic layer having a thickness of about 2,000 to 3,000 angstroms and composed of approximately 97 parts iron and 3 parts nickel, by weight.

References Cited by the Examiner

UNITED STATES PATENTS

| | | | |
|---|---|---|---|
| 2,848,390 | 8/1958 | Whitehurst et al. | 204—20 |
| 2,996,406 | 8/1961 | Weinrich | 117—35 |
| 3,031,386 | 4/1962 | Tsu et al. | 204—43 |
| 3,047,423 | 7/1962 | Eggenberger et al. | 204—43 |
| 3,047,475 | 7/1962 | Hespenheide | 204—43 |

JOHN H. MACK, *Primary Examiner.*

T. TUFARIELLO, *Assistant Examiner.*